United States Patent
Singh et al.

(10) Patent No.: US 9,852,728 B2
(45) Date of Patent: Dec. 26, 2017

(54) PROCESS FOR IMPROVING PRONUNCIATION OF PROPER NOUNS FOREIGN TO A TARGET LANGUAGE TEXT-TO-SPEECH SYSTEM

(71) Applicant: Nuance Communications, Inc., Burlington, MA (US)

(72) Inventors: Anurag Ratan Singh, Sunnyvale, CA (US); Yifang Xu, San Jose, CA (US); Ivan A. Sanchez Quijas, San Jose, CA (US); Mahesh Godavarti, Cupertino, CA (US)

(73) Assignee: Nuance Communications, Inc., Burlington, MA (US)

(*) Notice: Subject to any disclaimer, the term of this patent is extended or adjusted under 35 U.S.C. 154(b) by 0 days.

(21) Appl. No.: 14/733,289

(22) Filed: Jun. 8, 2015

(65) Prior Publication Data

US 2016/0358596 A1 Dec. 8, 2016

(51) Int. Cl.
*G06F 13/00* (2006.01)
*G10L 13/08* (2013.01)
(Continued)

(52) U.S. Cl.
CPC ............ *G10L 13/08* (2013.01); *G06F 17/278* (2013.01); *G06F 17/2881* (2013.01);
(Continued)

(58) Field of Classification Search
CPC ....... G10L 13/08; G10L 13/043; G10L 13/07; G06F 17/289; G06F 17/2872;
(Continued)

(56) References Cited

U.S. PATENT DOCUMENTS

| | | | |
|---|---|---|---|
| 6,208,968 B1* | 3/2001 | Vitale | G10L 13/08 704/260 |
| 7,472,061 B1* | 12/2008 | Alewine | G10L 13/08 704/243 |

(Continued)

OTHER PUBLICATIONS van den Heuvel, Henk, et al., "G2P conversion of names. What can we do (better)?," http://www.researchgate.net/publication/221490005_G2p_conversion_of_names_what_can_we_do_(better), (accessed on Jun. 8, 2015) (10 pages).

(Continued)

*Primary Examiner* — Vu B Hang
(74) *Attorney, Agent, or Firm* — Brian J. Colandreo; Michael T. Abramson; Holland & Knight LLP

(57) ABSTRACT

A system and method configured for use in a text-to-speech (TTS) system is provided. Embodiments may include identifying, using one or more processors, a word or phrase as a named entity and identifying a language of origin associated with the named entity. Embodiments may further include transliterating the named entity to a script associated with the language of origin. If the TTS system is operating in the language of origin, embodiments may include passing the transliterated script to the TTS system. If the TTS system is not operating in the language of origin, embodiments may include generating a phoneme sequence in the language of origin using a grapheme to phoneme (G2P) converter.

20 Claims, 5 Drawing Sheets

(51) Int. Cl.
 *G06F 17/27* (2006.01)
 *G06F 17/28* (2006.01)
 *G10L 13/04* (2013.01)

(52) U.S. Cl.
 CPC ........ *G06F 17/289* (2013.01); *G06F 17/2872* (2013.01); *G10L 13/043* (2013.01); *G10L 13/086* (2013.01)

(58) Field of Classification Search
 CPC .............. G06F 17/2755; G06F 9/4448; G06F 17/2785; G06F 17/274
 See application file for complete search history.

(56) References Cited

U.S. PATENT DOCUMENTS

2007/0106685 A1* 5/2007 Houh ................ G06F 17/30796
2009/0326914 A1* 12/2009 Joy .................... G06F 17/2223
 704/3

OTHER PUBLICATIONS

Yang, Qian, et al., "Development of a phoneme-to-phoneme (p2p) converter to improve the grapheme-to-phoneme (g2p) conversion of names," http://www.lrec-conf.org/proceedings/lrec2006/pdf/248_pdf.pdf, pp. 287-292 (accessed on Jun. 8, 2015).

Bhargava, Aditya, "How do you pronounce your name? Improving G2P with transliterations," www.cs.toronto.edu/~aditya/publications/pronounce-name.pdf (accessed on Jun. 8, 2015) (10 pages).

\* cited by examiner

PROCESS FOR IMPROVING PRONUNCIATION OF PROPER NOUNS FOREIGN TO A TARGET LANGUAGE TEXT-TO-SPEECH SYSTEM

TECHNICAL FIELD

This disclosure relates generally to a method for use in a text-to-speech ("TTS") system, and more particularly to a process for improving pronunciation of proper nouns foreign to a target language text-to-speech system.

BACKGROUND

Machine Transliteration ("MT") is the process of automatically converting the script of a word from a source language (e.g., English) to a target language (e.g., Hindi). The idea is to map a sequence of letters in one language to a sequence of letters in another language such that pronunciation is largely preserved. There are two types of transliteration, generative transliteration and transliteration extraction. Generative transliteration typically refers to on-the-fly transliteration for new terms where transliteration extraction involves learning rules from large multi-lingual corpora like the Web (e.g., Wikipedia, etc.).

SUMMARY OF DISCLOSURE

In one implementation, a method for use in a text-to-speech (TTS) system is provided. The method may include identifying, using one or more processors, a word or phrase as a named entity and identifying a language of origin associated with the named entity. The method may further include transliterating the named entity to a script associated with the language of origin. If the TTS system is operating in the language of origin, the method may include passing the transliterated script to the TTS system. If the TTS system is not operating in the language of origin, the method may include generating a phoneme sequence in the language of origin using a grapheme to phoneme (G2P) converter.

One or more of the following features may be included. In some embodiments, if the TTS system is not operating in the language of origin, the method may include mapping the phoneme sequence to a sequence of target language phonemes. In some embodiments, mapping may include generating a map of most likely unigram, bigram, and trigram mappings from the phoneme sequence to the sequence of target language phonemes. In some embodiments, the method may include identifying a word or phrase as a named entity includes one or more of table lookup and contextual analysis. Identifying a language of origin associated with the named entity may include one or more of table lookup and shortest distance measures to an existing names database. The method may further include augmenting a text to speech dictionary based upon, at least in part, the phoneme sequence. The text to speech dictionary may be associated with an automatic speech recognition (ASR) system.

In another implementation, a non-transitory computer-readable storage medium is provided. The non-transitory computer-readable storage medium may have stored thereon instructions, which when executed by a processor result in one or more operations. The operations may include identifying, using one or more processors, a word or phrase as a named entity and identifying a language of origin associated with the named entity. Operations may further include transliterating the named entity to a script associated with the language of origin. If the TTS system is operating in the language of origin, operations may include passing the transliterated script to the TTS system. If the TTS system is not operating in the language of origin, operations may include generating a phoneme sequence in the language of origin using a grapheme to phoneme (G2P) converter.

One or more of the following features may be included. In some embodiments, if the TTS system is not operating in the language of origin, operations may include mapping the phoneme sequence to a sequence of target language phonemes. In some embodiments, mapping may include generating a map of most likely unigram, bigram, and trigram mappings from the phoneme sequence to the sequence of target language phonemes. In some embodiments, operations may include identifying a word or phrase as a named entity includes one or more of table lookup and contextual analysis. Identifying a language of origin associated with the named entity may include one or more of table lookup and shortest distance measures to an existing names database. Operations may further include augmenting a text to speech dictionary based upon, at least in part, the phoneme sequence. The text to speech dictionary may be associated with an automatic speech recognition (ASR) system.

In another implementation, a system is provided. The system may include one or more processors configured to identify a word or phrase as a named entity, the one or more processors further configured to identify a language of origin associated with the named entity and transliterate the named entity to a script associated with the language of origin, if the TTS system is operating in the language of origin, the one or more processors further configured to pass the transliterated script to the TTS system, and if the TTS system is not operating in the language of origin, the one or more processors further configured to generate a phoneme sequence in the language of origin using a grapheme to phoneme (G2P) converter.

One or more of the following features may be included. In some embodiments, if the TTS system is not operating in the language of origin, the one or more processors may be further configured to map the phoneme sequence to a sequence of target language phonemes. In some embodiments, mapping may include generating a map of most likely unigram, bigram, and trigram mappings from the phoneme sequence to the sequence of target language phonemes. In some embodiments, the one or more processors may be further configured to identify a word or phrase as a named entity includes one or more of table lookup and contextual analysis. Identifying a language of origin associated with the named entity may include one or more of table lookup and shortest distance measures to an existing names database. The one or more processors may be further configured to augment a text to speech dictionary based upon, at least in part, the phoneme sequence.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Figure 1:
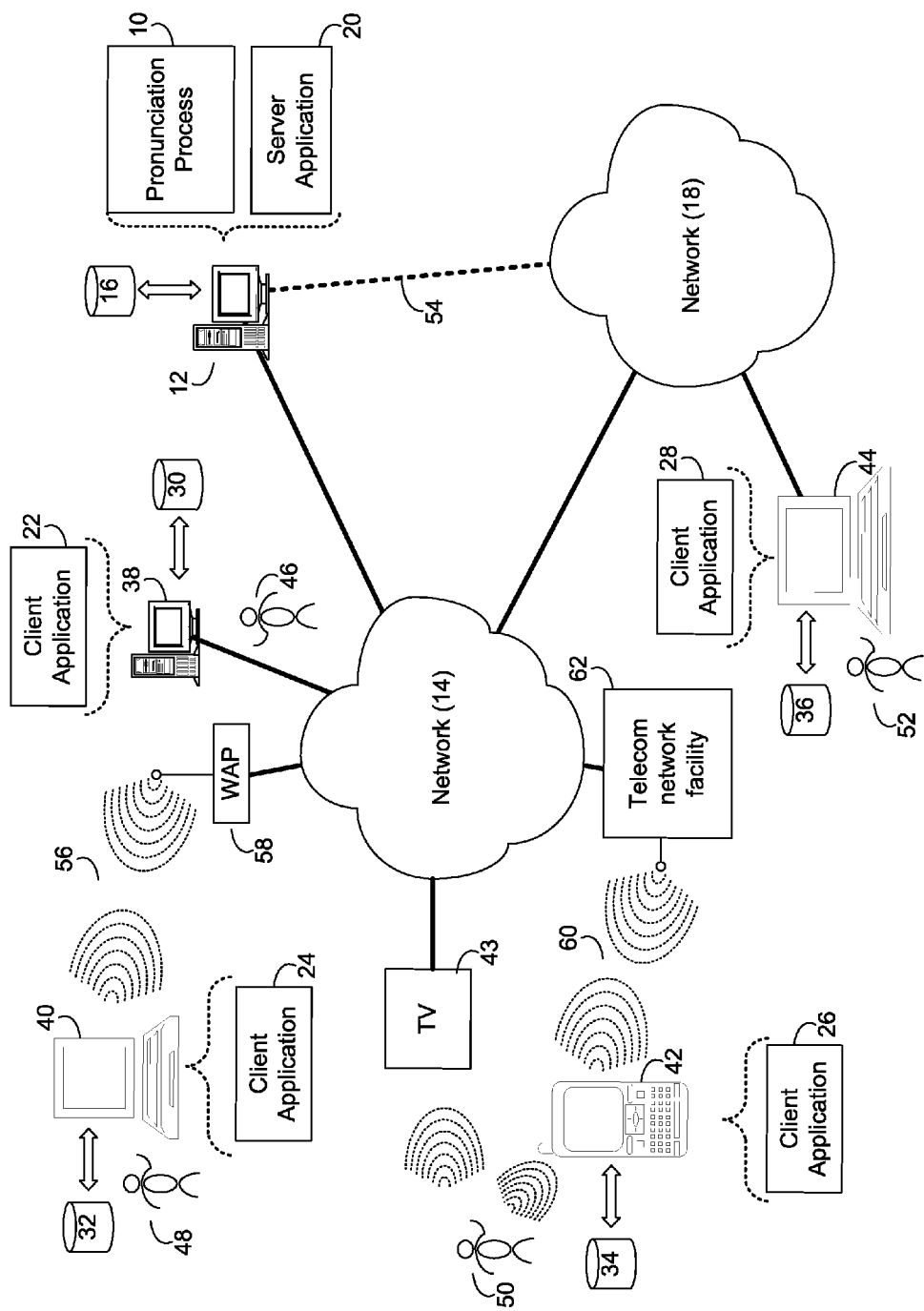
FIG. 1 is a diagrammatic view of a system configured to implement a pronunciation process in accordance with an embodiment of the present disclosure.

Embodiments provided herein are directed towards a system and method for improving pronunciation of proper nouns foreign to a target language text-to-speech system. It should be noted that while much of the discussion included herein may refer to a specific subset of proper nouns (names) the discussion easily extends to proper nouns in general. In existing systems, the pronunciation of names foreign to the target language using the target language pronunciation rules often results in a very poor TTS experience.

For example, a name, Mahesh, using US English pronunciation rules will be pronounced in International Phonetic Alphabet ("IPA") as "m ae h i ʃ" where the actual pronunciation is more accurately "m ʌ h eɪ ʃ". Another example, Anurag is pronounced as "ae n u r ae g" when in actuality it should be pronounced as "ʌ n u r ɑ g".

The problem arises from a misunderstanding by foreign language speakers of target language alphabet pronunciation rules. This misunderstanding results in a non-standard but consistent set of spelling across all names for that foreign language in target language alphabet. This spelling may be very different from the way native speakers (of the target language) would have spelled the foreign names if they were provided with the actual pronunciation of the foreign names.

Embodiments of pronunciation process 10 may help the target language TTS pronounce the foreign names closer to how the names should actually be pronounced using different pronunciation rules for the foreign names than those used by target language G2P.

Accordingly, embodiments disclosed herein may be configured to combine the advancement in data mining technology with transliteration technology to provide a novel solution to improve the pronunciation of names. For a Text-to-Speech (TTS) system or Automatic Speech Recognition (ASR) system a dictionary may be required to generate accurate pronunciations or to recognize words. This dictionary is usually written by linguists and may be limited in terms of the number of words it contains, for cost and time reasons. This usually leads for poor TTS or ASR performance especially when it comes to words that belong to an open class such as names. These issues may be alleviated through the use of a grapheme to phoneme (G2P) system that generates pronunciations for words not in the dictionary. However, this approach may perform poorly for names that do not follow the same pronunciation pattern that is present in the training dictionary, for example, names that are foreign to the locale for which the pronunciation is being generated. In order to generate good pronunciations, it makes the most sense to use a G2P system that belongs to the same language as the word for which the pronunciation is desired. Accordingly, embodiments of pronunciation process 10 may be used to implement a system that identifies and invokes the best G2P converter for a name based on its origin (e.g., the country where the name is most common) and derive near accurate pronunciations for the TTS or ASR system that has not been developed for the foreign name.

Embodiments of pronunciation process 10 may exploit the progress made in two work areas that are not fundamentally related to pronunciation improvement of foreign names. The first is an improvement in pronunciation capabilities of all G2Ps (regardless of language). A TTS may pronounce names that are native to its language much more accurately than names that are foreign to it. The second involves forward transliteration from the written form of foreign names language (e.g., name-origin language) to the written form of the target language and back transliteration from the target language to the name origin language. Considerable investment has been made in statistical machine transliteration of names as a subset of statistical machine translation. When documents are translated from one language to another proper nouns are not translated but are transliterated into the target language's alphabet to mimic the pronunciation of proper nouns in the source language as much as possible. Sometimes the transliteration may already exist as foreign speakers typically would be writing their names in the target language alphabet (e.g. Chinese names in English). Pronunciation process 10 may be configured to utilize machine transliteration techniques to obtain the accurate representation of foreign name in its native name origin alphabet.

Referring to FIG. 1, there is shown a pronunciation process 10 that may reside on and may be executed by computer 12, which may be connected to network 14 (e.g., the Internet or a local area network). Server application 20 may include some or all of the elements of pronunciation process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

Figure 2:
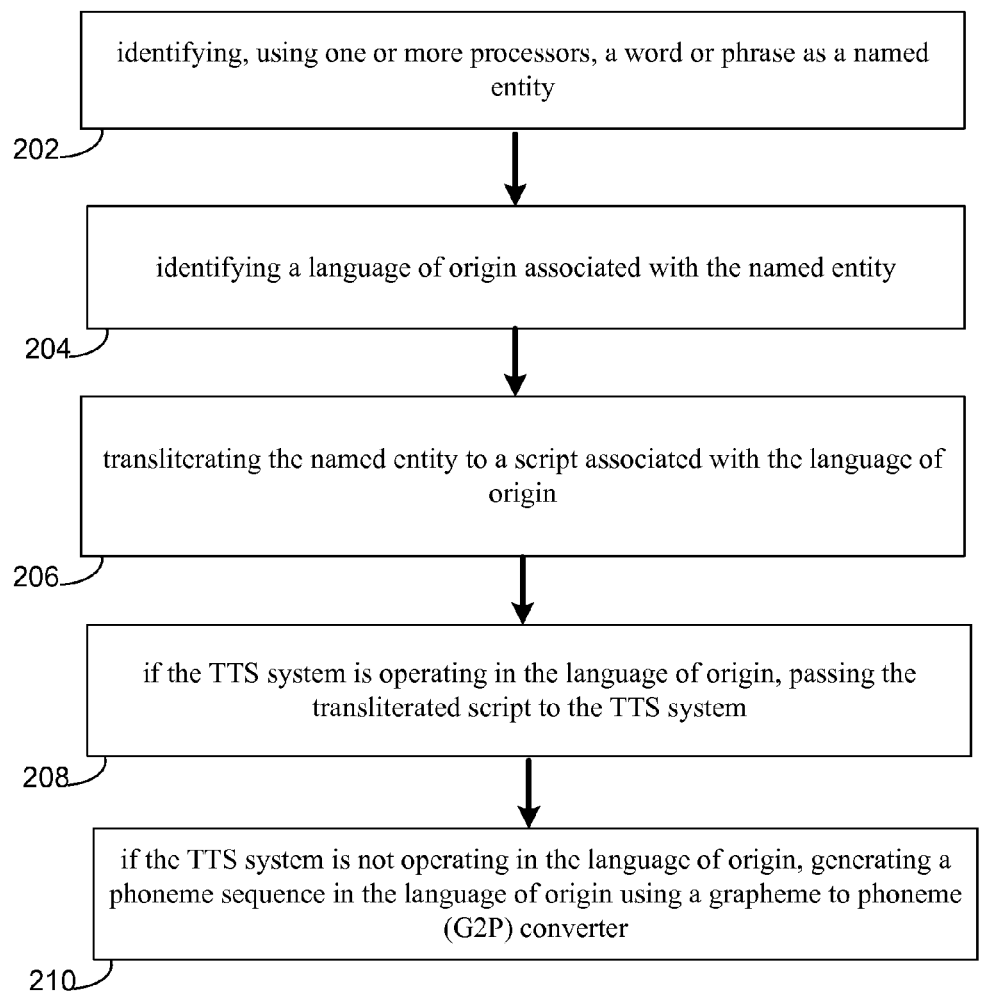
FIG. 2 is a flowchart of a pronunciation process in accordance with an embodiment of the present disclosure.

As will be discussed below in greater detail in FIGS. 2-3, pronunciation process 10 may include identifying (202), using one or more processors, a word or phrase as a named entity and identifying (204) a language of origin associated with the named entity. Embodiments may further include transliterating (206) the named entity to a script associated with the language of origin. If the TTS system is operating in the language of origin, embodiments may include passing (208) the transliterated script to the TTS system. If the TTS system is not operating in the language of origin, embodiments may include generating (210) a phoneme sequence in the language of origin using a grapheme to phoneme (G2P) converter.

The instruction sets and subroutines of pronunciation process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, pronunciation process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), a dedicated network device (not shown), an audio recording device, etc.

One or more of client applications 22, 24, 26, 28 may be configured to effectuate some or all of the functionality of pronunciation process 10. Accordingly, pronunciation process 10 may be a purely server-side application, a purely client-side application, or a hybrid server-side/client-side application that is cooperatively executed by one or more of client applications 22, 24, 26, 28 and pronunciation process 10.

Client electronic devices 38, 40, 42, 44 may each execute an operating system, examples of which may include but are not limited to Apple iOS™, Microsoft Windows™, Android™, Redhat Linux™, or a custom operating system. In some cases, the client electronic device may include audio recording functionality and/or may be an audio recording device.

Users 46, 48, 50, 52 may access computer 12 and pronunciation process 10 directly through network 14 or through secondary network 18. Further, computer 12 may be connected to network 14 through secondary network 18, as illustrated with phantom link line 54. In some embodiments, users may access pronunciation process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14. In some embodiments, smartphone 42 may be an audio recording device or may include audio recording functionality and may enable an end user to record a speech signal. The speech signal may be stored and/or transmitted to any of the devices described herein. For example, transmitted over network 14 to client electronic device 40.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between any of the computing devices shown in FIG. 1 (e.g., between cellphone 42 and server computing device 12).

Embodiments of pronunciation process 10 may be configured to accurately generate pronunciation of a foreign name in the TTS's phoneme set using a number of approaches. Accordingly, pronunciation process 10 may identify the origin of a foreign named entity and to subsequently transliterate the named entity to the script of language of origin. In some embodiments, if pronunciation process 10 is included as part a system (e.g. TTS) in language of origin then the process may be configured to pass the transliterated string to that system. In contrast, if using the original system then pronunciation process 10 may be configured to generate a phoneme sequence in the language of origin using a grapheme to phoneme (G2P) converter. Accordingly, pronunciation process 10 may map the sequence to a phoneme sequence in the original system such that resulting pronunciation is as faithful as possible to original. The mapped phoneme sequence may then be used in the original system. For example, one system may be included as part of client devices 38, 40, 42, etc., and another system may be part of server computing device 12. Any combination of devices is within the scope of the present disclosure.

An example consistent with embodiments of pronunciation process 10 is provided below. This example demonstrates the difference in pronunciation between an English TTS and Hindi TTS:

ANURAG (English)=> अनुराग (Hindi)
English: http://translate.google.com/translate_tts?tl=en&q=Anurag%E2%80%9D
Hindi: http://translate.google.com/translate_tts?tl=hi&q=Anurag%E2%80%9D Embodiments of pronunciation process 10 may be configured to locate the best map for the phoneme sequence from Hindi so that the resulting system sounds close to Hindi system. English (map—mock):
http://translate.google.com/translate_tts?tl=en&q=uhnoorAg%E2%80%9D Embodiments of pronunciation process 10 may be configured to identify the origin of a named entity. Accordingly, pronunciation process 10 may identify that the word or phrase in question is a named entity. This may either be assumed if the application is to pronounce names or may be deduced through statistical models (e.g., named entity resolution).

Embodiments of pronunciation process 10 may be configured to identify a name origin. This piece may identify the most likely origin for a name. Some approaches for identifying a name origin may include, but are not limited to, using existing name databases on the web (e.g., www.behindthename.com), using a named entity (NE) recognition algorithm on a large corpus, searching for the name in open database (www.dmoz.org), the Wikipedia corpus, etc.

In some embodiments, for each name, the number of direct hits (e.g. found name in list of Indian names) or semantically similar hits (e.g. found words like Hindu or Sanskrit in place of Indian, but both are related to India) may be determined and counted. If a direct match is not found then pronunciation process 10 may attempt to match based on a minimal edit distance (e.g., Levenshtein distance). In some embodiments, indirect matches may be given a fraction of the direct match score. In some embodiments, pronunciation process 10 may be configured to normalize the score for each country that TTS engine supports. This step may provide the probability based on which an appropriate target language transliteration model will be used.

Embodiments of pronunciation process 10 may be configured to generate one or more transliteration models. In some embodiments, this may include obtaining or creating a dictionary of named entity mappings for different language pairs. The names largely preserve the phonetic information, so it may be important that only names are used in the mapping. This mapping may be performed using any suitable approach, some of which are provided below.

If available through a corpus provider, obtain a dictionary which maps names from one script to another. If a mapping is not available then a dictionary may be created through the use of a parallel corpus. Parallel corpora have translations of sentences from one language to another and are widely used in Statistical Machine Translation ("SMT").

In some embodiments, a dictionary may be created by extracting named entities (e.g., person, place, etc.) in each language through the use of Named Entity recognition algorithms and then a map can be formed based on SMT word/phrase level alignment scores (see MTTK: Machine Translation Toolkit—http://mi.eng.cam.ac.uk/~wjb31/distrib/mttkv1/). Additionally and/or alternatively, a web corpus (e.g., Wikipedia) may include translations of a page on a person, and using the title or the hyperlinks it may be easy to identify a name in different languages. This may then be used to create a mapping. Any other suitable transliteration extraction scheme may also be employed. In some embodiments, mapping may also be created through crowdsourcing schemes (e.g., Amazon Mechanical Turk) where native speakers are required to write out the names in an audio in their language.

Once the dictionary is generated or obtained, pronunciation process 10 may be configured to generate pronunciations for a name for each language. This may be performed using any suitable approach. For example, obtaining the IPA or Extended Speech Assessment Methods Phonetic Alphabet ("X-SAMPA") pronunciation in the name origin language.

In some embodiments, pronunciation process 10 may be configured to develop a map that finds the closest approximation in IPA or X-SAMPA in target language. Pronunciation process 10 may further include converting to target phoneme sequence and utilizing a data driven approach to develop a phoneme mapping. For example, a linguist or linguistic approach may label words in name origin phoneme set and target phoneme set and use this data to apply a sequence labeling algorithm. Some of these may include, but are not limited to, Hidden Markov Model or Conditional Random Field. The model may be used to convert the phonemes from one set to another.

In some embodiments, once the dictionary and the pronunciations are obtained that information may be used to train a transliteration model. The model may be spelling based and may incorporate phonetic information.

Embodiments of pronunciation process 10 may be configured to generate speech with same speaker (e.g. English) for foreign names (e.g., Indian names) and may transliterate the name in its origin language script. Accordingly, pronunciation process 10 may use an origin language grapheme to phoneme converter (G2P) to generate a phoneme sequence. Once acquired, pronunciation process 10 may map this phoneme sequence to best sequence for original language (e.g., English). Pronunciation process 10 may then synthesize speech using this mapped phoneme sequence.

Embodiments of pronunciation process 10 may be configured to generate reasonable pronunciations for foreign names. This may occur either offline (e.g., as a one-time augmentation to dictionary that is used in TTS system) or online as a service that assists a grapheme to phoneme module (G2P), which may be a very common situation in the case of TTS where the vocabulary is not known completely in advance.

Additionally and/or alternatively, embodiments of pronunciation process 10 may improve speech recognition performance for multi-lingual speakers. In this way, dictionaries used in training speech recognition engines may be augmented with good pronunciations for foreign names, product brands, etc.

In some embodiments, pronunciation process 10 may be configured to generate name pronunciations accurately with different language TTS speakers and may transliterate a name in its origin language. Accordingly, pronunciation process 10 may invoke the origin language TTS with the transliteration as input.

In some embodiments, pronunciation process 10 may be integrated with one or more social networks. In this way, the TTS based application may be deployed as an enhancement to social network service where it is not uncommon to have connections from various countries. Additionally and/or alternatively, pronunciation process 10 may be associated with one or more smartphone applications. For example, as a travel app, which may be configured to generate reasonable pronunciations for people/place names in English language travel guide. Numerous other features are within the scope of the present disclosure.

Embodiments of pronunciation process 10 may allow for the exploitation of the superior performance of the G2P engine designed for the TTS of the native language of the foreign name. The G2P engine of the foreign name's native language may be far superior to the target language's G2P in generating the pronunciation for that foreign name. Accordingly, pronunciation process 10 may be configured to leverage the tremendous amount of research that has been focused in the area of machine translation of written text and machine transliteration of written proper nouns. Back transliteration (e.g., from the target language back to the foreign language) provides an accurate written form of the foreign name in its native alphabet which may then be fed to the associated foreign G2P.

Figure 3:
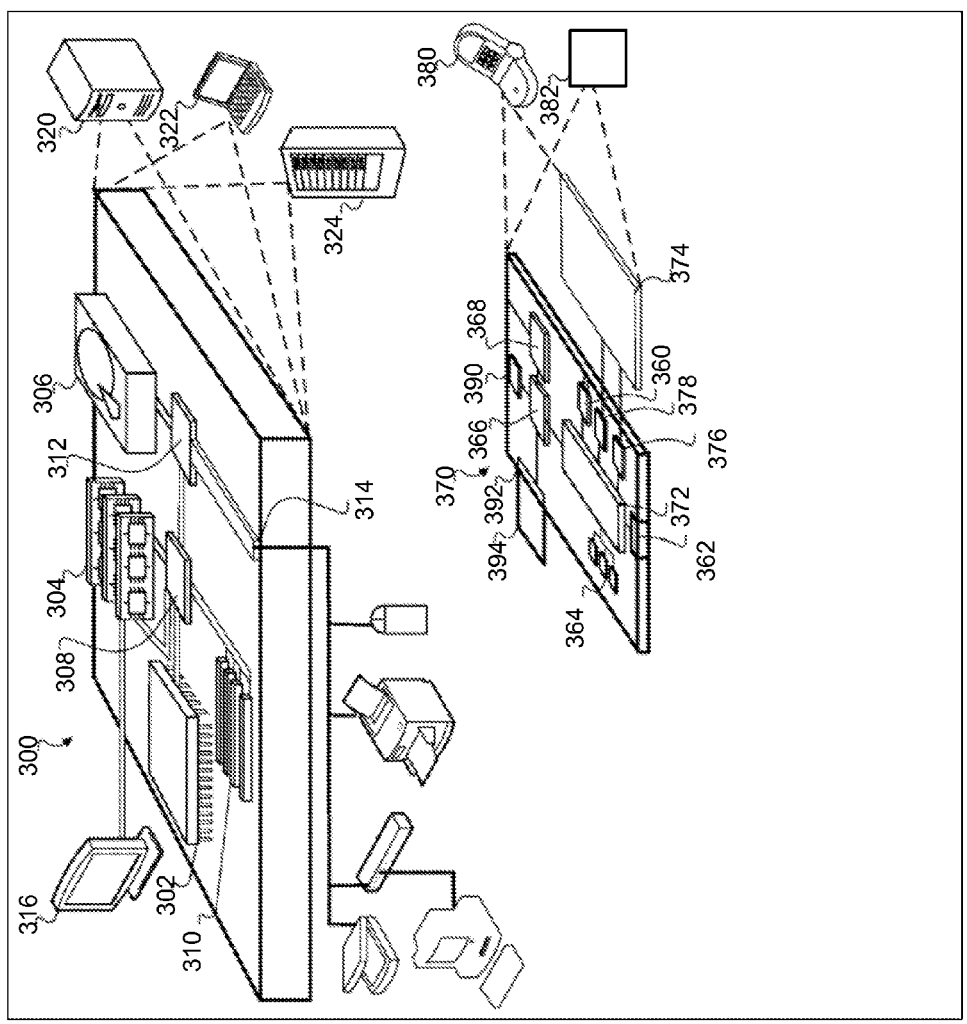
FIG. 3 shows an example of a computer device and a mobile computer device that can be used in accordance with the pronunciation process described herein.

Referring now to FIG. 3, an example of a generic computer device 300 and a generic mobile computer device 370, which may be used with the techniques described here is provided. Computing device 300 is intended to represent various forms of digital computers, such as tablet computers, laptops, desktops, workstations, personal digital assistants, servers, blade servers, mainframes, and other appropriate computers. In some embodiments, computing device 370 can include various forms of mobile devices, such as personal digital assistants, cellular telephones, smartphones, and other similar computing devices. Computing device 370 and/or computing device 300 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 300 may include processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, may be interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

Memory 304 may store information within the computing device 300. In one implementation, the memory 304 may be a volatile memory unit or units. In another implementation, the memory 304 may be a non-volatile memory unit or units. The memory 304 may also be another form of computer-readable medium, such as a magnetic or optical disk.

Storage device 306 may be capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

High speed controller 308 may manage bandwidth-intensive operations for the computing device 300, while the low speed controller 312 may manage lower bandwidth-intensive operations. Such allocation of functions is exemplary only. In one implementation, the high-speed controller 303 may be coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 370. Each of such devices may contain one or more of computing device 300, 370, and an entire system may be made up of multiple computing devices 300, 370 communicating with each other.

Computing device 370 may include a processor 372, memory 364, an input/output device such as a display 374, a communication interface 366, and a transceiver 368, among other components. The device 370 may also be provided with a storage device, such as a microdrive or other device, to provide additional storage. Each of the components 370, 372, 364, 374, 366, and 368, may be interconnected using various buses, and several of the components may be mounted on a common motherboard or in other manners as appropriate.

Processor 372 may execute instructions within the computing device 370, including instructions stored in the memory 364. The processor may be implemented as a chipset of chips that include separate and multiple analog and digital processors. The processor may provide, for example, for coordination of the other components of the device 370, such as control of user interfaces, applications run by device 370, and wireless communication by device 370.

In some embodiments, processor 372 may communicate with a user through control interface 378 and display interface 376 coupled to a display 374. The display 374 may be, for example, a TFT LCD (Thin-Film-Transistor Liquid Crystal Display) or an OLED (Organic Light Emitting Diode) display, or other appropriate display technology. The display interface 376 may comprise appropriate circuitry for driving the display 374 to present graphical and other information to a user. The control interface 378 may receive commands from a user and convert them for submission to the processor 372. In addition, an external interface 362 may be provide in communication with processor 372, so as to enable near area communication of device 370 with other devices. External interface 362 may provide, for example, for wired communication in some implementations, or for wireless communication in other implementations, and multiple interfaces may also be used.

In some embodiments, memory 364 may store information within the computing device 370. The memory 364 can be implemented as one or more of a computer-readable medium or media, a volatile memory unit or units, or a non-volatile memory unit or units. Expansion memory 374 may also be provided and connected to device 370 through expansion interface 372, which may include, for example, a SIMM (Single In Line Memory Module) card interface. Such expansion memory 374 may provide extra storage space for device 370, or may also store applications or other information for device 370. Specifically, expansion memory 374 may include instructions to carry out or supplement the processes described above, and may include secure information also. Thus, for example, expansion memory 374 may be provide as a security module for device 370, and may be programmed with instructions that permit secure use of device 370. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 364, expansion memory 374, memory on processor 372, or a propagated signal that may be received, for example, over transceiver 368 or external interface 362.

Device 370 may communicate wirelessly through communication interface 366, which may include digital signal processing circuitry where necessary. Communication interface 366 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 363. In addition, short-range communication may occur, such as using a Bluetooth, WiFi, or other such transceiver (not shown). In addition, GPS (Global Positioning System) receiver module 370 may provide additional navigation- and location-related wireless data to device 370, which may be used as appropriate by applications running on device 370.

Device 370 may also communicate audibly using audio codec 360, which may receive spoken information from a user and convert it to usable digital information. Audio codec 360 may likewise generate audible sound for a user, such as through a speaker, e.g., in a handset of device 370. Such sound may include sound from voice telephone calls, may include recorded sound (e.g., voice messages, music files, etc.) and may also include sound generated by applications operating on device 370.

Computing device 370 may be implemented in a number of different forms, as shown in the figure. For example, it may be implemented as a cellular telephone 380. It may also be implemented as part of a smartphone 382, personal digital assistant, remote control, or other similar mobile device.

Figure 4:
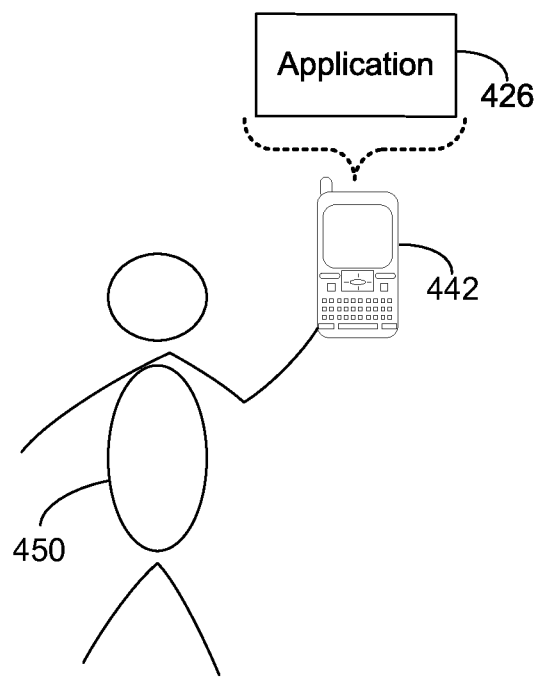
FIG. 4 is a diagrammatic view of a system configured to implement a pronunciation process in accordance with an embodiment of the present disclosure.
Figure 5:
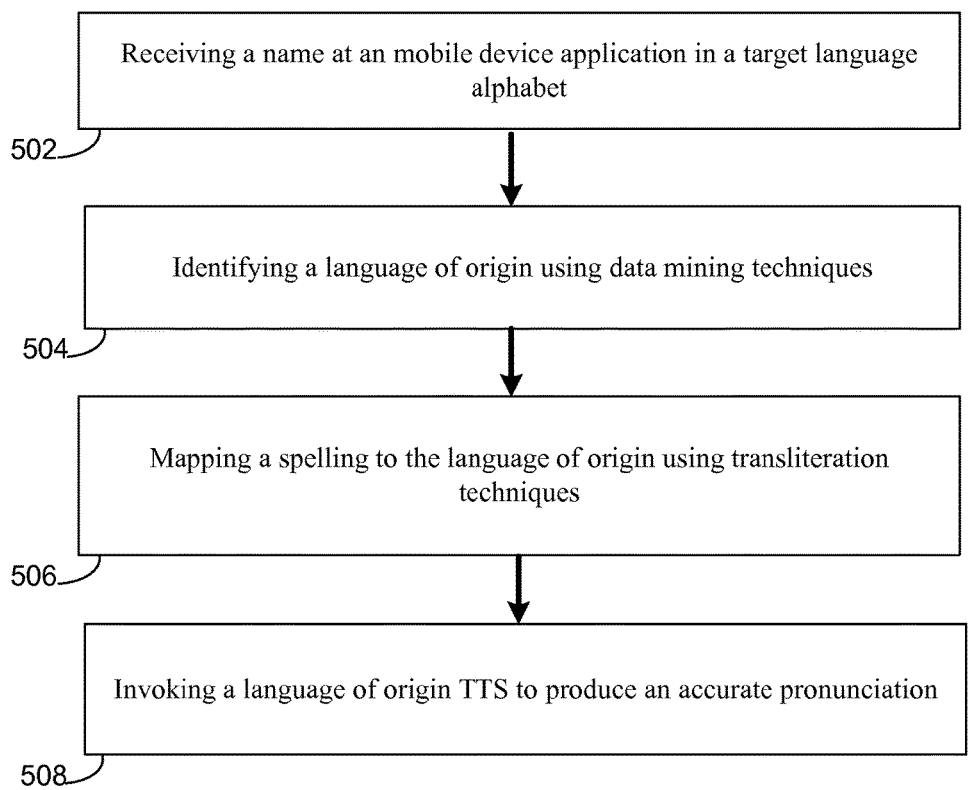
FIG. 5 is a flowchart of a pronunciation process in accordance with an embodiment of the present disclosure.

Referring now to FIGS. 4-5, additional embodiments consistent with pronunciation process 10 are provided. In this particular embodiment, a name pronunciation application consistent with pronunciation process 10 may be executed on mobile device 442. For example, as an iPhone App, Android App or the like. In operation, a name may be input into the application in the target language alphabet (e.g., English). The language of origin may be identified using data mining techniques (e.g., either through a stored dictionary, by identifying from the sequence of letters the most likely language, etc.). In some embodiments, the spelling may be mapped to the language of origin using transliteration techniques. Additionally and/or alternatively, the language of origin TTS may be invoked to provide an accurate pronunciation. It should be noted that, in some embodiments, the phoneme sequence from the language of origin may be mapped back to the best phoneme sequence in the target language.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method configured for use in a text-to-speech (TTS) system comprising:
 identifying, using one or more processors, a word or phrase as a named entity;
 identifying a language of origin associated with the named entity;
 transliterating the named entity to a script associated with the language of origin;
 if the TTS system is operating in the language of origin, passing the transliterated script to the TTS system; and if the TTS system is not operating in the language of origin, generating a phoneme sequence in the language of origin using a grapheme to phoneme (G2P) converter.

2. The method of claim 1, further comprising:
if the TTS system is not operating in the language of origin, mapping the phoneme sequence to a sequence of target language phonemes.

3. The method of claim 2, wherein mapping includes generating a map of most likely unigram, bigram, and trigram mappings from the phoneme sequence to the sequence of target language phonemes.

4. The method of claim 1, wherein identifying a word or phrase as a named entity includes one or more of table lookup and contextual analysis.

5. The method of claim 1, wherein identifying a language of origin associated with the named entity includes one or more of table lookup and shortest distance measures to an existing names database.

6. The method of claim 1, further comprising:
augmenting a text to speech dictionary based upon, at least in part, the phoneme sequence.

7. The method of claim 6, wherein the text to speech dictionary is associated with an automatic speech recognition (ASR) system.

8. A non-transitory computer-readable storage medium having stored thereon instructions, which when executed by a processor result in one or more operations configured for use in a text-to-speech (TTS) system, the operations comprising:
identifying, using one or more processors, a word or phrase as a named entity;
identifying a language of origin associated with the named entity;
transliterating the named entity to a script associated with the language of origin;
if the TTS system is operating in the language of origin, passing the transliterated script to the TTS system; and
if the TTS system is not operating in the language of origin, generating a phoneme sequence in the language of origin using a grapheme to phoneme (G2P) converter.

9. The non-transitory computer-readable storage medium of claim 8, further comprising:
if the TTS system is not operating in the language of origin, mapping the phoneme sequence to a sequence of target language phonemes.

10. The non-transitory computer-readable storage medium of claim 9, wherein mapping includes generating a map of most likely unigram, bigram, and trigram mappings from the phoneme sequence to the sequence of target language phonemes.

11. The non-transitory computer-readable storage medium of claim 8, wherein identifying a word or phrase as a named entity includes one or more of table lookup and contextual analysis.

12. The non-transitory computer-readable storage medium of claim 8, wherein identifying a language of origin associated with the named entity includes one or more of table lookup and shortest distance measures to an existing names database.

13. The non-transitory computer-readable storage medium of claim 8, further comprising:
augmenting a text to speech dictionary based upon, at least in part, the phoneme sequence.

14. The non-transitory computer-readable storage medium of claim 13, wherein the text to speech dictionary is associated with an automatic speech recognition (ASR) system.

15. A text to speech system comprising:
one or more processors configured to identify a word or phrase as a named entity, the one or more processors further configured to identify a language of origin associated with the named entity and transliterate the named entity to a script associated with the language of origin, if the TTS system is operating in the language of origin, the one or more processors further configured to pass the transliterated script to the TTS system, and if the TTS system is not operating in the language of origin, the one or more processors further configured to generate a phoneme sequence in the language of origin using a grapheme to phoneme (G2P) converter.

16. The system of claim 15, wherein if the TTS system is not operating in the language of origin, mapping the phoneme sequence to a sequence of target language phonemes.

17. The system of claim 16, wherein mapping includes generating a map of most likely unigram, bigram, and trigram mappings from the phoneme sequence to the sequence of target language phonemes.

18. The system of claim 15, wherein identifying a word or phrase as a named entity includes one or more of table lookup and contextual analysis.

19. The system of claim 15, wherein identifying a language of origin associated with the named entity includes one or more of table lookup and shortest distance measures to an existing names database.

20. The system of claim 15, further comprising:
augmenting a text to speech dictionary based upon, at least in part, the phoneme sequence.

* * * * *